US008687265B2

(12) United States Patent
Ahn et al.

(10) Patent No.: US 8,687,265 B2

(45) Date of Patent: Apr. 1, 2014

(54) METHODS OF OPERATING A DISPLAY DEVICE

(75) Inventors: Seongdeok Ahn, Daejeon (KR); Seung Youl Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 13/326,310

(22) Filed: Dec. 14, 2011

(65) Prior Publication Data

US 2012/0154899 A1 Jun. 21, 2012

(30) Foreign Application Priority Data

Dec. 15, 2010 (KR) ........................ 10-2010-0128395

(51) Int. Cl.

*G02B 26/00* (2006.01)

*G09G 3/34* (2006.01)

(52) U.S. Cl.

USPC ........................................... 359/296; 345/107

(58) Field of Classification Search

USPC .................................. 359/290–298; 345/107

See application file for complete search history.

(56) References Cited

U.S. PATENT DOCUMENTS

| | | | | |
|---|---|---|---|---|
| 5,961,804 | A | 10/1999 | Jacobson et al. | |
| 6,262,706 | B1 | 7/2001 | Albert et al. | |
| 6,262,833 | B1 | 7/2001 | Loxley et al. | |
| 6,327,072 | B1 | 12/2001 | Comiskey et al. | |
| 2003/0132908 | A1 * | 7/2003 | Herb et al. | 345/107 |
| 2008/0117495 | A1 * | 5/2008 | Arango et al. | 359/296 |
| 2011/0134508 | A1 * | 6/2011 | Kawashima et al. | 359/296 |

FOREIGN PATENT DOCUMENTS

JP 2006-343458 A 12/2006

OTHER PUBLICATIONS

I. Ota et al., "Electrophoretic Image Display (EPID) Panel", Proceedings of the IEEE, vol. 61, No. 7, pp. 832-836, Jul. 1973.

P. Murau et al., "The understanding and elimination of some suspension instabilities in an electrophoretic display", J. Appl. Phys. 49(9), pp. 4820-4829, Sep. 1978.

* cited by examiner

*Primary Examiner* — Mohammed Hasan

(74) *Attorney, Agent, or Firm* — Rabin & Berdo, P.C.

(57) ABSTRACT

Provided are methods of operating display devices. The method includes applying a first electric field to a capsule including first particles having a first color and second particles having a second color to move the first and second particles into a first region of the capsule; and applying a second electric field to the capsule to move the second particles into a second region of the capsule different from the first region and to leave the first particles in the first region of the capsule.

11 Claims, 8 Drawing Sheets

METHODS OF OPERATING A DISPLAY DEVICE

CROSS-REFERENCE TO RELATED APPLICATIONS

This U.S. non-provisional patent application claims priority under 35 U.S.C. §119 to Korean Patent Application No. 10-2010-0128395, filed on Dec. 15, 2010, the entirety of which is incorporated by reference herein.

BACKGROUND

The present disclosure herein relates to methods of operating a display device.

Display devices have been widely used in small-sized electronic devices such as mobile phones and PDAs as well as in televisions and computers because of light, slim and/or low-power consumption characteristics thereof. As used in various electronic devices and industrial fields, the display devices with high reliability and/or improved color gamut may be increasingly demanded.

For satisfying the above demands, various researches have been conducted for methods of operating the display devices applied with technique displaying color by moving particles having color within a fluid

SUMMARY

Embodiments of the inventive concept may provide methods of operating display devices with high reliability.

Embodiments of the inventive concept may also provide methods of operating display devices with improved color gamut.

According to example embodiments of the inventive concepts, a method of operating a display device may include: applying a first electric field to a capsule including first particles having a first color and second particles having a second color to move the first and second particles into a first region of the capsule; and applying a second electric field to the capsule to move the second particles into a second region of the capsule different from the first region and to leave the first particles in the first region of the capsule.

In some embodiments, the first electric field may be stronger in strength than the second electric field.

In other embodiments, a direction of the first electric field may be anti-parallel to a direction of the second electric field.

In still other embodiments, the first region may be a display region of the capsule and the second region may be a non-display region of the capsule.

In yet other embodiments, the first and second particles may be electrically charged with charges having the same polarity with each other, and a quantity of charge in each of the second particles may be greater than a quantity of charge in each of the first particles.

In yet still other embodiments, the capsule further includes third particles having a third color. The third particles may be electrically charged with charges having the same polarity as the first and second particles, and a quantity of charge in each of the third particles may be different from the quantity of charge in each of the second particles and the quantity of charge in each of the first particles.

In further embodiments, the third particles may be moved into the first region of the capsule when the first electric field is applied to the capsule, and the third particles may be moved into the second region of the capsule when the second electric field is applied to the capsule. In this case, the quantity of charge in each of the third particles may be greater than the quantity of charge in each of the first particles.

In still further embodiments, the third particles may remain in the second region when the first electric field is applied to the capsule and the second electric field is applied to the capsule. In this case, the quantity of charge in each of the third particles may be less than the quantity of charge in each of the first particles In even further embodiments, the third particles may be moved into the first region of the capsule when the first electric field is applied to the capsule, and the third particles may remain in the first region when the second electric field is applied to the capsule. In this case, the quantity of charge in each of the third particles may be less than the quantity of charge in each of the second particles In yet further embodiments, the method may further include applying a third electric field to the capsule to move the first particles into the second region of the capsule and to leave the third particles in the first region of the capsule. The quantity of charge in each of the third particles may be less than the quantity of charge in each of the first particles.

In yet further embodiments, the third electric field may be stronger in strength than the second electric field, and a direction of the third electric field may be the same as a direction of the second electric field.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
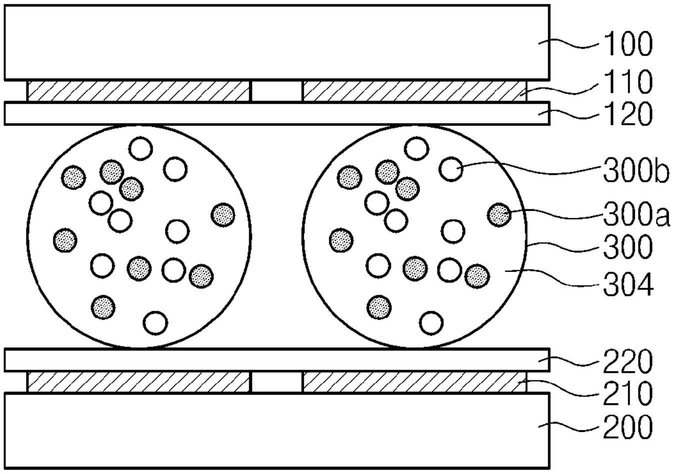
FIG. 1 is a cross sectional view illustrating a display device according to a first embodiment of the inventive concept.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Methods of operating a display device according to a first embodiment of the inventive concept will be described hereinafter.

FIG. 1 is a cross sectional view illustrating a display device according to a first embodiment of the inventive concept.

Referring to FIG. 1, a display device according to a first embodiment of the inventive concept may include a first substrate 100 and a second substrate 200 facing each other. In an embodiment, each of the first and second substrates 100 and 200 may be formed of a transparent material. Alternatively, one of the first and second substrates 100 and 200 may include a non-transparent material. The first substrate 100 may include a first surface and a second surface opposite to the first surface. The first surface of the first substrate 100 may be adjacent to the second substrate 200. The second surface of the first substrate 100 may be a display surface of the display device.

A first electrode 110 may be disposed on the first surface of the first substrate 100. In an embodiment, the first electrode 110 may be provided in a plural number on the first surface of the first substrate 100. In this case, the first electrodes 110 may be laterally spaced apart from each other. A first electrode protection layer 120 may be disposed on the first surface of the first substrate 100. The first electrode 110 may be disposed between the first electrode protection layer 120 and the first substrate 100.

A second electrode 210 may be disposed on a top surface of the second substrate 200 adjacent to the first substrate 100. In an embodiment, the second electrode 210 may be provided in a plural number on the top surface of the second substrate 200. In this case, the second electrodes 210 may be laterally spaced apart from each other. A second electrode protection layer 220 may be disposed on the top surface of the second substrate 200. The second electrode 210 may be disposed between the second electrode protection layer 220 and the second substrate 200.

A capsule 300 may be disposed between the first electrode 110 and the second electrode 210. The capsule 300 may include first particles 300*a*, second particles 300*b* and a fluid 304 surrounding the first and second particles 300*a* and 300*b*. Each of the first particles 300*a* may have a first color. Each of the second particles 300*b* may have a second color different from the first color. In an embodiment, the first color may be a black color, and the second color may be a white color.

The capsule 300 may include a display region and a non-display region. The colors of the particles in the non-display region may not be displayed, and the colors of the particles in the display region may be displayed. The display region may be adjacent to the display surface of the substrate 100 (e.g. the second surface of the substrate 100).

The first particles 300*a* and the second particles 300*b* may be electrically charged with the charges having the same polarity with each other. The first particles 300*a* may have the same quantity of charge. The second particles 300*b* may have the same quantity of charge. The quantity of charge in each of the first particles 300*a* may be different from that in each of the second particles 300*b*. In an embodiment, the quantity of charge in each of the first particles 300*a* may be less than that in each of the second particles 300*b*.

The strength of an electric field applied to the capsule 300 may vary depending on voltages applied to the first and second electrodes 110 and 210. Thus, the first particles 300*a* and second particles 300*b* in the capsule 300 may be selectively moved. The movement of the particles 300*a* and 300*b* will be described with reference to FIGS. 2A to 2D in more detail.

FIGS. 2A to 2D are cross sectional views illustrating a method of operating a display device according to a first embodiment of the inventive concept.

Figure 2A:
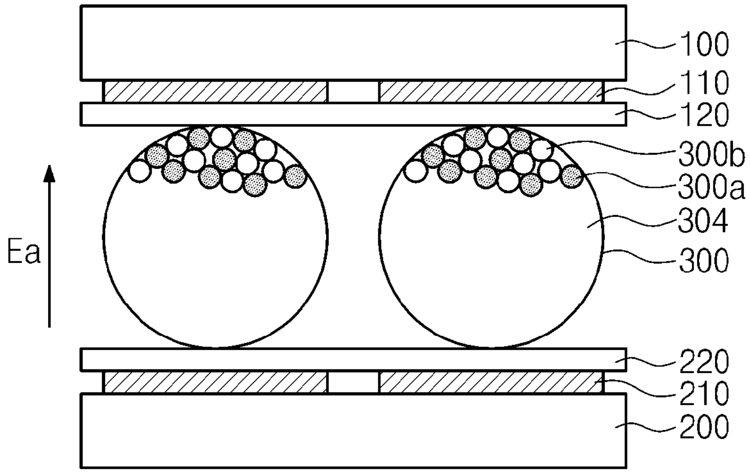
FIGS. 2A to 2D are cross sectional views illustrating a method of operating a display device according to a first embodiment of the inventive concept.

Referring to FIG. 2A, voltages having levels different from each other may be applied to the first electrode 110 and the second electrode 210, respectively. A first voltage may be applied to the first electrode 110, and a second voltage may be applied to the second electrode 210. The first voltage may have a level lower than that of the second voltage. A first electric field Ea from the second electrode 210 toward the first electrode 110 may be applied to the capsule 300 by difference between the first and second voltages each applied to the first and second electrodes 110 and 210.

In an embodiment, the first particles 300*a* and the second particles 300*b* may be electrically charged with positive charges. The first electric field Ea may have the strength being able to move the first and second particles 300*a* and 300*b*. In this case, the first particles 300*a* and the second particles 300*b* may be moved into a first region of the capsule 300 by the first electric field Ea. The first region of the capsule 300 may be a region of the capsule 300 adjacent to the first electrode 110. The first region may be the display region of the capsule 300. In this case, a mixed color of the first color and the second color may be displayed on the display surface of the first substrate 100.

Figure 2B:
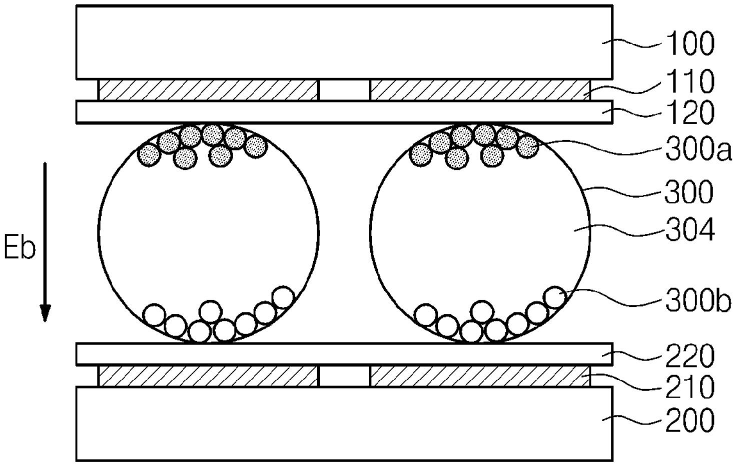

Referring to FIG. 2B, after moving the first particles 300*a* and the second particles 300*b* into the first region, a third voltage may be applied to the first electrode 110 and a fourth voltage may be applied to the second electrode 210. The fourth voltage may be lower in level than the third voltage. A second electric field Eb from the first electrode 110 to the second electrode 210 may be applied to the capsule 300 by difference between the third and fourth voltages each applied to the first and second electrodes 110 and 210.

The difference between the first voltage and the second voltage may be greater than that between the third voltage and the fourth voltage. Thus, the strength of the second electric field Eb may be weaker than that of the first electric field Ea. As described above, the quantity of charge in each of the first particles 300*a* may be less than that in each of the second particles 300*b*.

The second electric field Eb may have the strength which is able to move the second particles 300*b* in the capsule 300, but is not able to move the first particles 300*a* in the capsule 300. As a result, the second particles 300*b* may be moved in a second region of the capsule 300, and the first particles 300*a* may remain in the first region of the capsule 300. The second region of the capsule 300 may be another region of the capsule 300 adjacent to the second electrode 210. The second region may be the non-display region of the capsule 300. In this case, the first color may be displayed on the display surface of the first substrate 100.

Figure 2C:
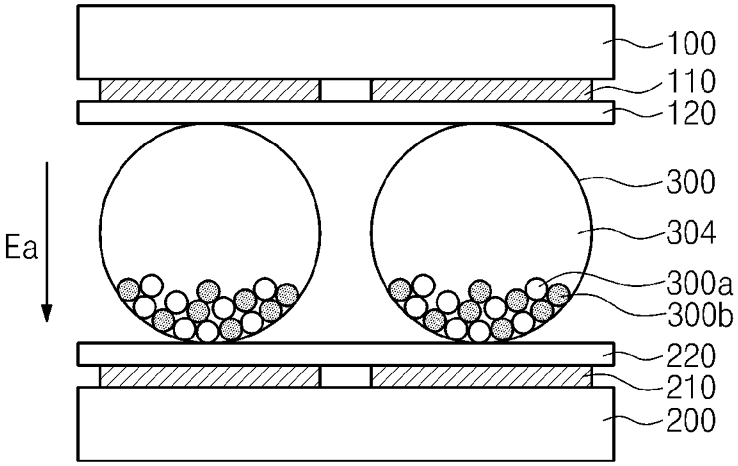

Referring to FIG. 2C, the second voltage may be applied to the first electrode 110, and the first voltage may be applied to the second electrode 210. The first electric field Ea from the first electrode 110 toward the second electrode 210 may be applied to the capsule 300 by the difference between the second and first voltages respectively each applied to the first and second electrodes 110 and 210. Since the second and first voltages may applied to the first and second electrodes 110 and 210, respectively, a direction of the first electric field Ea in FIG. 2C may be anti-parallel to that of the first electric field Ea in FIG. 2A. The first particles 300*a* in the first region may be moved into the second region of the capsule 300 by the first electric field Ea in FIG. 2C. The second particles 300*b* may stay in the second region of the capsule 300. In this case, a mixed color of the first and second colors lighter than the mixed color described with reference to FIG. 2A may be displayed on the display surface of the first substrate 100.

Figure 2D:
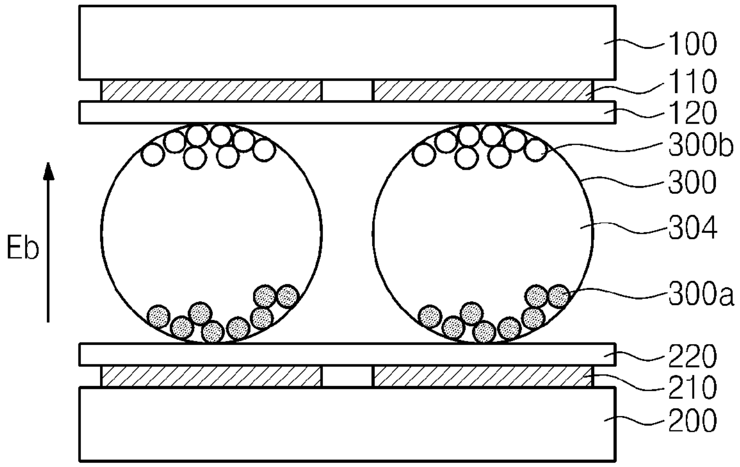

Referring to FIG. 2D, the fourth voltage may be applied to the first electrode 110 and the third voltage may be applied to the second electrode 210. The second electric field Eb from the second electrode 210 toward the first electrode 110 may be applied to the capsule 300 by the difference between the fourth and third voltages applied to the first and second electrodes 110 and 210, respectively. Since the fourth and third voltages may applied to the first and second electrodes 110 and 210, respectively, a direction of the second electric field Eb in FIG. 2D may be anti-parallel to that of the second electric field Eb in FIG. 2B. The second particles 300*b* in the second region may be moved into the first region of the capsule 300 by the second electric field Eb in FIG. 2D. The first particles 300*a* may stay in the second region of the capsule 300. In this case, the second color may be displayed on the display surface of the first substrate 100.

A display device according to a second embodiment of the inventive concept will be described hereinafter.

Figure 3:
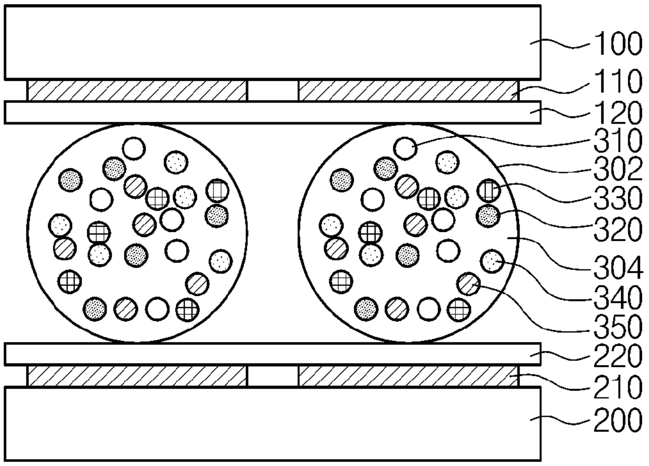
FIG. 3 is a cross sectional view illustrating a display device according to a second embodiment of the inventive concept.

FIG. 3 is a cross sectional view illustrating a display device according to a second embodiment of the inventive concept.

Referring to FIG. 3, the display device according to a second embodiment of the inventive concept may include the first substrate 100, the first electrode 110, the first electrode protection layer 120, the second substrate 200, the second electrode 210, and the second electrode protection layer 220 described with reference to FIG. 1. A capsule 302 may be disposed between the first electrode 110 and the second electrode 210. The capsule 302 may include first particles 310, second particles 320, third particles 330, fourth particles 340, fifth particles 350 and the fluid 304 surrounding the first to fifth particles 310, 320, 330, 340, and 350. The first particles 310, the second particles 320, the third particles 330, the fourth particles 340, and the fifth particles 350 may have a first color, a second color, a third color, a fourth color, and a fifth color, respectively. The first color, the second color, the third color, the fourth color, and the fifth color may be a white color, a black color, a red color, a green color and a blue color, respectively.

The first to fifth particles 310, 320, 330, 340, and 350 may be electrically charged with charges having the same polarity with each other. Particles having the same color with each other may have the same quantity of charge, and particles having the different colors from each other may have the different quantities of charge from each other. In an embodiment, quantities of charge in the first, second, third, fourth and fifth particles 310, 320, 330, 340, and 350 may be different from each other, and the quantities of charge in the first, second, third, fourth and fifth particles 310, 320, 330, 340, and 350 may be decreased in the order named. For example, the quantity of charge in the first particle 310 may be greatest among those of the first to fifth particles 310, 320, 330, 340, and 350, and the quantity of charge in the fifth particle 350 may be smallest among those of the first to fifth particles 310, 320, 330, 340, and 350. The quantity of charge in the third particle 330 may smaller than that of the second particle 320 and greater than that of the fourth particle 340.

The strength of an electric field applied to the capsule 300 may vary depending on voltages each applied to the first and second electrodes 110 and 210. Thus, the first to fifth particles 310, 320, 330, 340, and 350 in the capsule 300 may be selectively moved. The movement of the particles 310, 320, 330, 340, and 350 will be described with reference to FIGS. 4A to 4J in more detail.

FIGS. 4A to 4J are cross sectional views illustrating methods of operating display devices according to a second embodiment of the inventive concept.

Figure 4A:
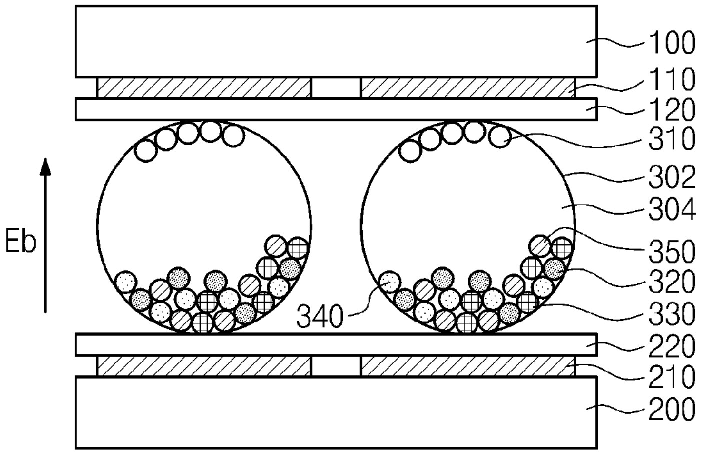
FIGS. 4A to 4J are cross sectional views illustrating a method of operating a display device according to a second embodiment of the inventive concept.

Referring to FIG. 4A, a first voltage may be applied to the first electrode 110, and a second voltage may be applied to the second electrode 210. The first voltage may have a level lower than that of the second voltage. A first electric field E1 from the second electrode 210 toward the first electrode 110 may be applied to the capsule 302 by difference between the first and second voltages each applied to the first and second electrodes 110 and 210.

In an embodiment, the first to fifth particles 310, 320, 330, 340, and 350 may be electrically charged with positive charges. The quantity of charge in each of the first particles 310 may be greater than that in each of the second to fifth particles 320, 330, 340, and 350. The first electric field E1 may have the strength which is able to move the first particles 310 in the capsule 302, but is not able to move the second to fifth particles 320, 330, 340 and 350. The first particles 310 may be moved into a first region of the capsule 302 by the first electric field E1, but the second to fifth particles 320, 330, 340 and 350 may remain in a second region of the capsule 302. The first region of the capsule 302 may be a region of the capsule 302 adjacent to the first electrode 110, and the second region of the capsule 302 may be another region of the capsule 302 adjacent to the second electrode 210. The first region may be a display region of the capsule 302, and the second region may be a non-display region of the capsule 302. In this case (i.e. after applying the first electric field E1 illustrated in FIG. 4A), the first color may be displayed on the display surface of the first substrate 100.

Figure 4B:
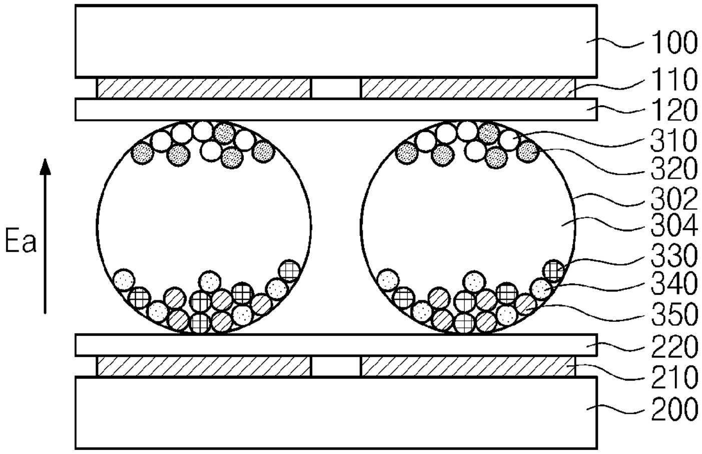

Referring to FIG. 4B, a third voltage may be applied to the first electrode 110 and a fourth voltage may be applied to the second electrode 210. The third voltage may have a level lower than that of the fourth voltage. A second electric field E2 from the second electrode 210 toward the first electrode 110 may be applied to the capsule 302 by difference between the third and fourth voltages each applied to the first and second electrodes 110 and 210. The difference between the third voltage and the fourth voltage may be greater than that between the first voltage and the second voltage. Thus, the second electric field E2 may be stronger in strength than the first electric field E1. The quantity of charge in each of the second particles 320 may be greater than that in each of the third to fifth particles 330, 340, and 350. The second electric field E2 may have the strength which is able to move the first and second particles 310 and 320 in the capsule 302, but is not able to move the third to fifth particles 330, 340, and 350.

The second particles 320 may be moved into the first region of the capsule 302 by the second electric field E2, but the third to fifth particles 330, 340, and 350 may remain in the second region of the capsule 302. The first particles 310 may stay in the first region of the capsule 302. In this case, a mixed color of the first and second colors may be displayed on the display surface of the first substrate 100.

Figure 4C:
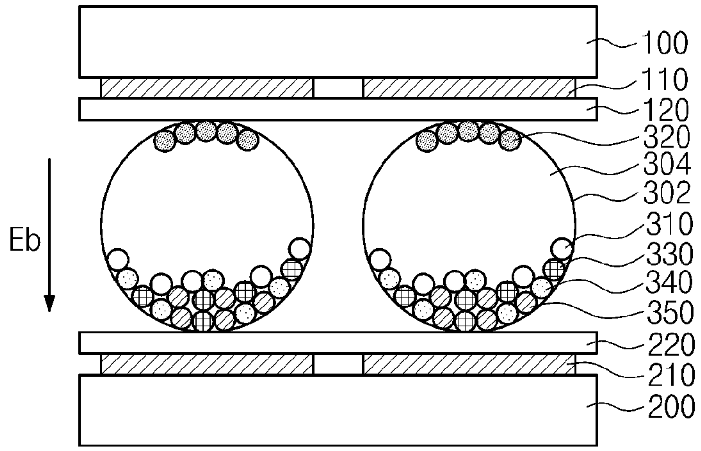

Referring to FIG. 4C, the second voltage may be applied to the first electrode 110, and the first voltage may be applied to the second electrode 210. The first electric field E1 from the first electrode 110 toward the second electrode 210 may be applied to the capsule 302 by difference between the second and first voltages respectively each applied to the first and second electrodes 110 and 210. The direction of the first electric field E1 in FIG. 4C may be anti-parallel to that of the first electric field E1 in FIG. 4A.

The first particles 310 may be moved into the second region of the capsule 302 by the first electric field E1 in FIG. 4C, and the second particles 320 may remain in the first region of the capsule 302. The third to fifth particles 330, 340 and 350 may stay in the second region of the capsule 302. In this case, the second color may be displayed on the display surface of the first substrate 100.

Figure 4D:
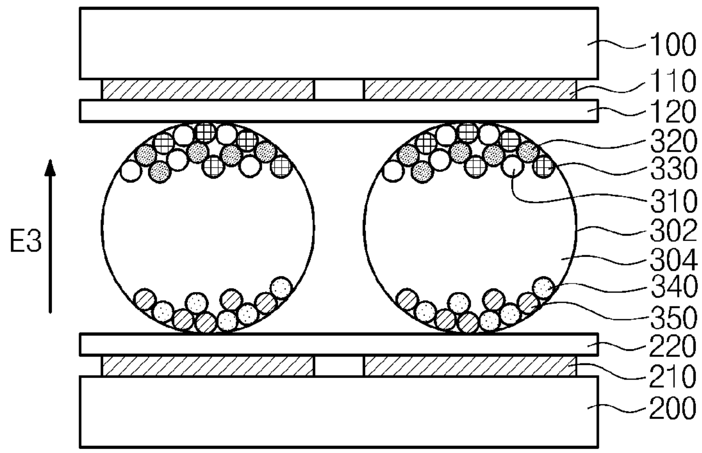

Referring to FIG. 4D, a fifth voltage may be applied to the first electrode 110, and a sixth voltage may be applied to the second electrode 210. The fifth voltage may be lower in level than the sixth voltage. A third electric field E3 from the second electrode 210 toward the first electrode 110 may be applied to the capsule 302 by difference between the fifth and sixth voltages each applied to the first and second electrodes 110 and 210.

The difference between the fifth voltage and the sixth voltage may be greater than that between the third voltage and the fourth voltage. Thus, the third electric field E3 may be stronger in strength than the second electric field E2. The quantity of charge in each of the third particles 330 may be greater than that in each of the fourth and fifth particles 340 and 350. The third electric field E3 may have the strength which is able to move the first to third particles 310, 320 and 330 in the capsule 302, but is not able to move the fourth and fifth particles 340 and 350.

The first and third particles 310 and 330 may be moved into the first region of the capsule 302 by the third electric field E3, and the fourth and fifth particles 340 and 350 may be remain in the second region of the capsule 302. The second particles 320 may stay in the first region of the capsule 302. In this case, a mixed color of the first, second and third colors may be displayed on the display surface of the first substrate 100.

Figure 4E:
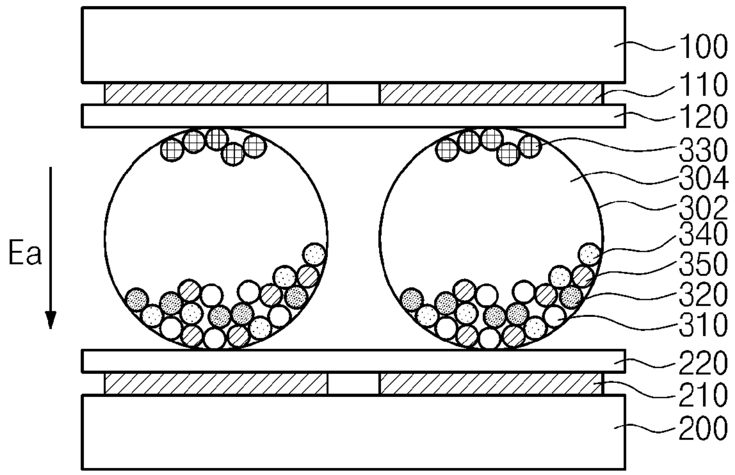

Referring to FIG. 4E, the fourth voltage may be applied to the first electrode 110, and the third voltage may be applied to the second electrode 210. The second electric field E2 from the first electrode 110 toward the second electrode 210 may be applied to the capsule 302 by difference between the fourth and third voltages respectively each applied to the first and second electrodes 110 and 210. The direction of the second electric field E2 in FIG. 4E may be anti-parallel to that of the second electric field E2 in FIG. 4B.

The first and second particles 310 and 320 may be moved into the second region of the capsule 302 by the second electric field E2 in FIG. 4E, and the third particles 330 may remain in the first region of the capsule 302. The fourth and fifth particles 340 and 350 may stay in the second region of the capsule 302. In this case, the third color may be displayed on the display surface of the first substrate 100.

Figure 4F:
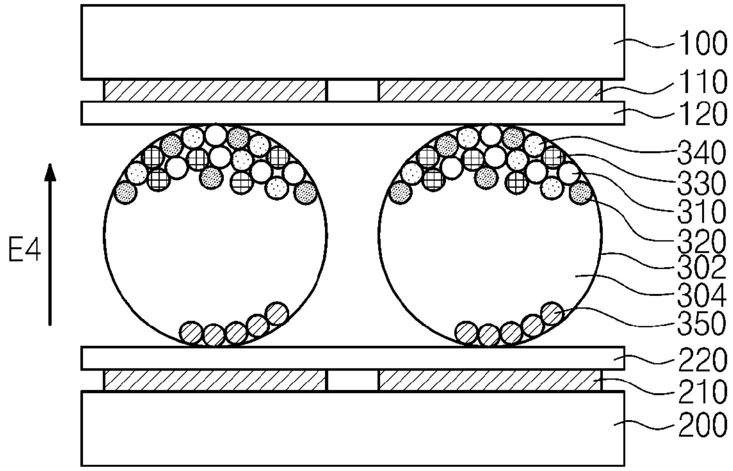

Referring to FIG. 4F, a seventh voltage may be applied to the first electrode 110 and an eighth voltage may be applied to the second electrode 210. The seventh voltage may be lower in level than the eighth voltage. A fourth electric field E4 from the second electrode 210 toward the first electrode 110 may be applied to the capsule 302 by difference between the seventh and eighth voltages each applied to the first and second electrodes 110 and 210.

The difference between the seventh voltage and the eighth voltage may be greater than that between the fifth voltage and the sixth voltage. Thus, the fourth electric field E4 may be stronger in strength than the third electric field E3. The quantity of charge in each of the fourth particles 340 may be greater than that in each of the fifth particles 350. The fourth electric field E4 may have the strength which is able to move the first to fourth particles 310, 320, 330, and 340 in the capsule 302, but is not able to move fifth particles 350.

The first, second and fourth particles 310, 320, and 340 may be moved into the first region of the capsule 302 by the fourth electric field E4, and the fifth particles 340 may remain in the second region of the capsule 302. The third particles 330 may stay in the first region of the capsule 302. In this case, a mixed color of the first, second, third and fourth colors may be displayed on the display surface of the first substrate 100.

Figure 4G:
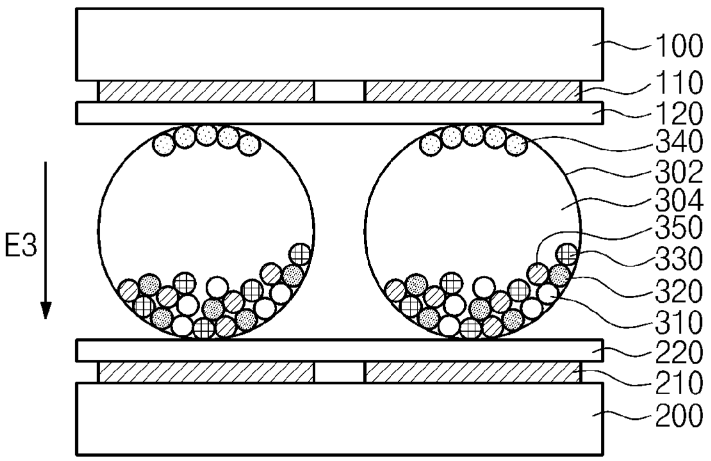

Referring to FIG. 4G, the sixth voltage may be applied to the first electrode 110, and the fifth voltage may be applied to the second electrode 210. The third electric field E3 from the first electrode 110 toward the second electrode 210 may be applied to the capsule 302 by the difference between the sixth and fifth voltages each applied to the first and second electrodes 110 and 210. The direction of the third electric field E3 in FIG. 4G may be anti-parallel to that of the third electric field E3 in FIG. 4D.

The first to third particles 310, 320 and 330 may be moved into the second region of the capsule 302 by the third electric field E3 in FIG. 4G, and the fourth particles 340 may remain in the first region of the capsule 302. The fifth particles 350 may stay in the second region of the capsule 302. In this case, the fourth color may be displayed on the display surface of the first substrate 100.

Figure 4H:
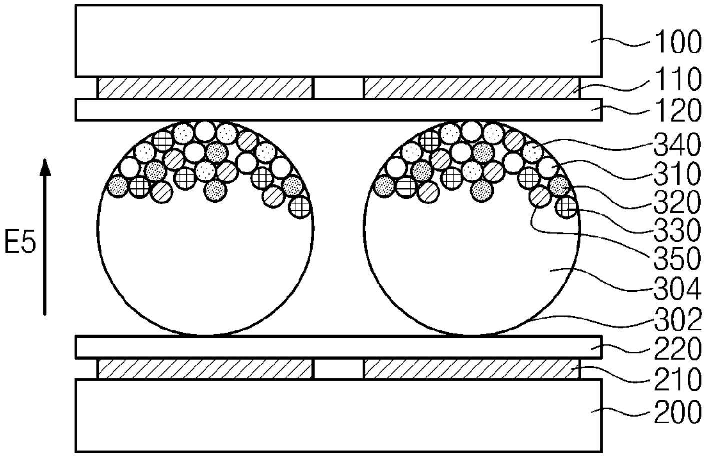

Referring to FIG. 4H, a ninth voltage may be applied to the first electrode 110, and a tenth voltage may be applied to the second electrode 210. The ninth voltage may be lower in level than the tenth voltage. A fifth electric field E5 from the second electrode 210 toward the first electrode 110 may be applied to the capsule 302 by difference between the ninth and tenth voltages each applied to the first and second electrode 110 and 210.

The difference between the ninth voltage and the tenth voltage may be greater than that between the seventh voltage and the eighth voltage. Thus, the strength of the fifth electric field E5 may be stronger than that of the fourth electric field E4. The fifth electric field E5 may have the strength which is able to move the first to fifth particles 310, 320, 330, 340 and 350 in the capsule 302.

The first, second, third, and fifth particles 310, 320, 330, and 350 may be moved into the first region of the capsule 302 by the fifth electric field E5. The fourth particles 340 may stay in the first region of the capsule 302. In this case, a mixed color of the first to fifth colors may be displayed on the display surface of the first substrate 100.

Figure 4I:
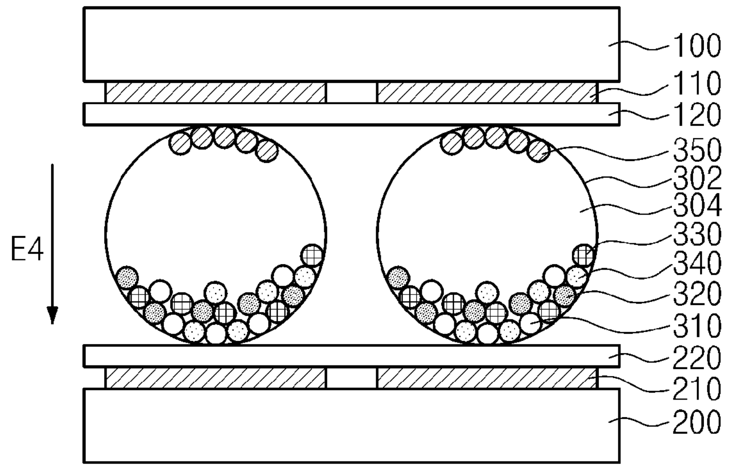

Referring to FIG. 4I, the eighth voltage may be applied to the first electrode 110, and the seventh voltage may be applied to the second electrode 210. The fourth electric field E4 from the first electrode 110 toward the second electrode 210 may be applied to the capsule 302 by difference between the eighth and seventh voltages each applied to the first and second electrodes 110 and 210. The direction of the fourth electric field E4 in FIG. 4I may be anti-parallel to that of the fourth electric field E4 in FIG. 4F.

The first to fourth particles 310, 320, 330, and 340 may be moved into the second region of the capsule 302 by the fourth electric field E4 in FIG. 4I, and the fifth particles 350 may remain in the first region of the capsule 302. In this case, the fifth color may be displayed on the display surface of the first substrate 100.

Figure 4J:
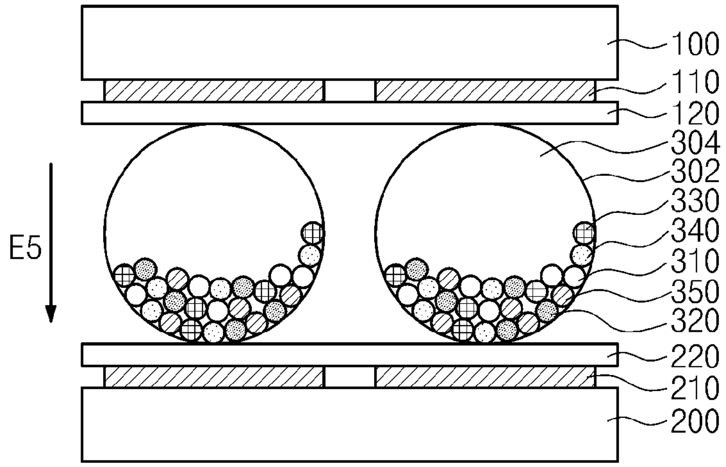

Referring to FIG. 4J, the tenth voltage may be applied to the first electrode 110, and the ninth voltage may be applied to the second electrode 210. Thus, the fifth electric field E5 from the first electrode 110 toward the second electrode 210 may be applied to the capsule 302. The direction of the fifth electric field E5 in FIG. 4J may be anti-parallel to that of the fifth electric field E5 in FIG. 4H. The fifth particles 350 may be moved into the second region of the capsule 302 by the fifth electric field E5 in FIG. 4J. In this case, a mixed color of the first to fifth colors lighter than the mixed color of the first to fifth colors described with reference to FIG. 4H may be displayed on the display surface of the first substrate 100.

According to embodiments described above, the capsule may include a plurality of particles each having a plurality of colors, and the plurality of particles may be selectively moved depending on the strength of an electric field applied the capsule, thereby displaying a color. As a result, methods of operating display devices with high reliability and improved color gamut may be provided.

According to embodiments of the inventive concept, a first electric field may be applied to a capsule including first particles having a first color and second particles having a second color, so that the first and second particles may be moved into a first region of the capsule. And a second electric field may be applied to the capsule, so that the second particles may be moved into a second region of the capsule, but the first particles may remain in the first region of the capsule. As a result, methods of operating display devices with high reliability and improved color gamut may be provided.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of operating a display device, comprising:

applying a first electric field to a capsule including first particles having a first color and second particles having a second color to move the first and second particles into a first region of the capsule; and applying, after the first and second particles move into the first region, a second electric field to the capsule to move the second particles into a second region of the capsule different from the first region and to leave the first particles in the first region of the capsule.

2. The method of claim 1, wherein the first electric field is stronger in strength than the second electric field.

3. The method of claim 1, wherein a direction of the first electric field is anti-parallel to a direction of the second electric field.

4. The method of claim 1, wherein the first region is a display region of the capsule and the second region is a non-display region of the capsule.

5. The method of claim 1, wherein the first and second particles are electrically charged with charges having the same polarity with each other, and a quantity of charge in each of the second particles is greater than a quantity of charge in each of the first particles.

6. A method of operating a display device, comprising:

applying a first electric field to a capsule including first particles having a first color and second particles having a second color to move the first and second particles into a first region of the capsule; and applying a second electric field to the capsule to move the second particles into a second region of the capsule different from the first region and to leave the first particles in the first region of the capsule;

wherein the first and second particles are electrically charged with charges having the same polarity with each other, and a quantity of charge in each of the second particles is greater than a quantity of charge in each of the first particles;

wherein the capsule further includes third particles having a third color;

wherein the third particles are electrically charged with charges having the same polarity as the first and second particles; and wherein a quantity of charge in each of the third particles is different from the quantity of charge in each of the second particles and the quantity of charge in each of the first particles.

7. The method of claim 6, wherein the third particles are moved into the first region of the capsule when the first electric field is applied to the capsule;

wherein the third particles are moved into the second region of the capsule when the second electric field is applied to the capsule; and wherein the quantity of charge in each of the third particles is greater than the quantity of charge in each of the first particles.

8. The method of claim 6, wherein the third particles remain in the second region when the first electric field is applied to the capsule and the second electric field is applied to the capsule; and wherein the quantity of charge in each of the third particles is less than the quantity of charge in each of the first particles.

9. The method of claim 6, wherein the third particles are moved into the first region of the capsule when the first electric field is applied to the capsule;

wherein the third particles remain in the first region when the second electric field is applied to the capsule; and wherein the quantity of charge in each of the third particles is less than the quantity of charge in each of the second particles.

10. The method of claim 9, further comprising:

applying a third electric field to the capsule to move the first particles into the second region of the capsule and to leave the third particles in the first region of the capsule, wherein the quantity of charge in each of the third particles is less than the quantity of charge in each of the first particles.

11. The method of claim 10, wherein the third electric field is stronger in strength than the second electric field; and wherein a direction of the third electric field is the same as a direction of the second electric field.

* * * * *